UNITED STATES PATENT OFFICE.

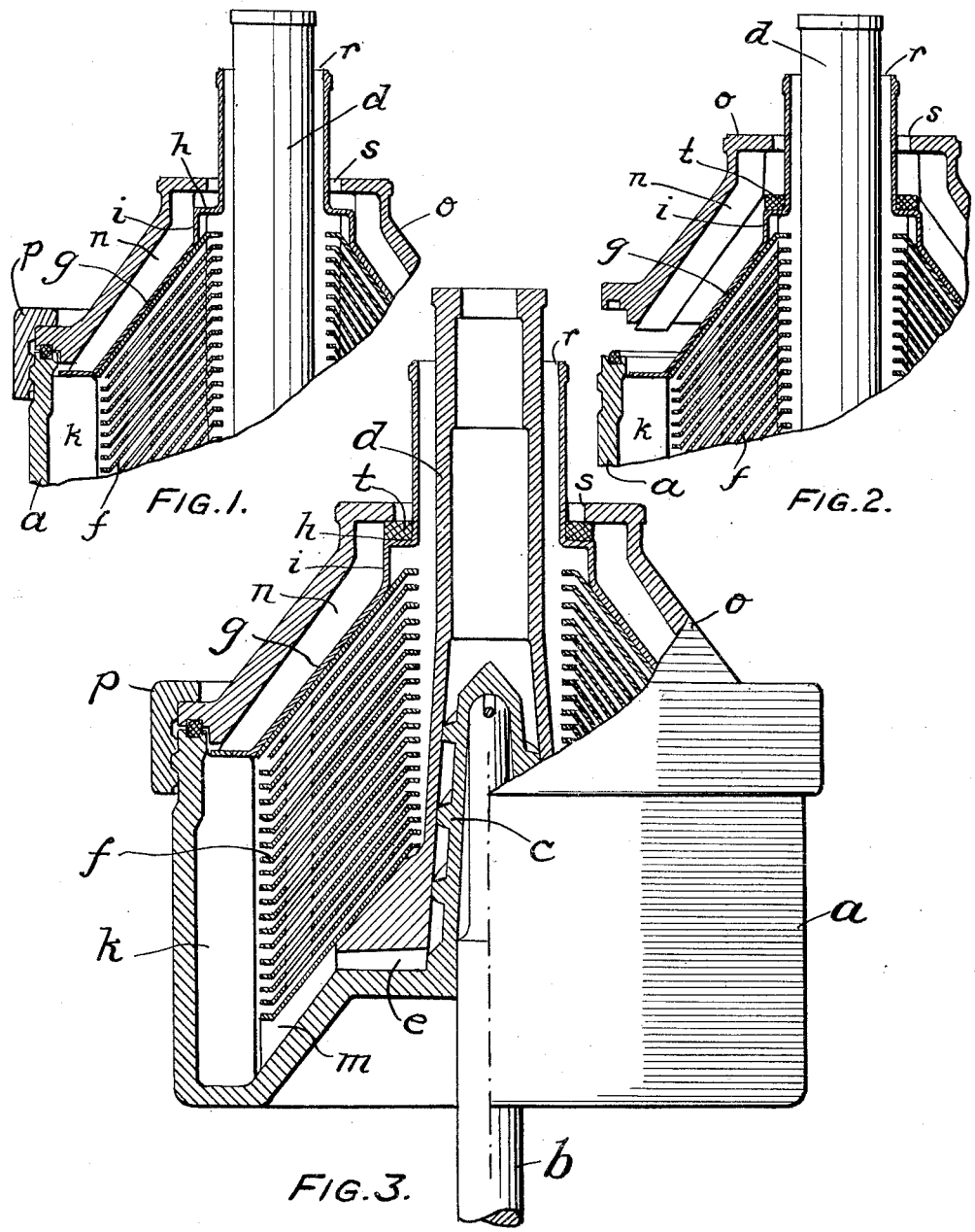

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

CENTRIFUGAL MACHINE.

1,422,856.  Specification of Letters Patent.  Patented July 18, 1922.

Application filed May 5, 1921. Serial No. 466,962.

*To all whom it may concern:*

Be it known that I, CYRUS HOWARD HAPGOOD, a citizen of the United States, residing at Nutley, county of Essex, and State of New Jersey, have invented a new and useful Improvement in Centrifugal Machines, of which the following is a full, clear, and exact description, reference being had to the accompanying drawings, which form a part of this specification.

The object of my invention is to provide a centrifuge which can be used as a separator for separating two liquids of different specific gravities or as a purifier for separating one liquid from another liquid and a solid, and which can be readily altered to adapt it for use as a clarifier for separating a solid from a liquid or for separating a lighter liquid from a heavier liquid admixed therewith in very small proportions.

The uses to which my improved convertible centrifuge may be put are of such varied character that it is impossible to specify them all even in general terms. In certain cases the centrifuge may be used for carrying out wholly dissimilar processes that have heretofore been carried out in differently constructed machines. In other cases the centrifuge may be used for carrying out, in the same process, dissimilar steps that have required, or would require, differently constructed machines. To illustrate one specific use of my convertible centrifuge as applied to a process of the last named class, I shall briefly describe a process of purifying and dehydrating switch oil that is more fully set forth in an application filed by me May 3, 1921, Serial No. 466,496.

It is necessary, in many instances, to immerse electric switches in oil in order to avoid the formation or persistence of destructive arcs. This is especially true where the amperage is so high that the blowing out of the arc could not be effected by a magnet or other known means and when, therefore, there would be a destructive burning of the switch contact points.

After each use of the oil there is more or less breaking down of the oil into carbon, a large part of which is colloidal carbon. After repeated operations of the switch, the accumulation of carbon becomes so great that the oil is unfit for further use. There is, also, more or less contamination of the oil by dirt and water. While the percentage of water that is absorbed by the oil is very small, the presence of an amount of water so small as to be negligible for most uses for which oil is available is objectionable in switch oil, as it seriously reduces its dielectric strength.

In the first step of the process, to one hundred gallons of oil I add about three pounds of oleic acid (red oil), which is miscible in all proportions with the mineral oil usually used. While maintaining the solution heated I add an alkaline solution (say about one and one-half pounds of soda ash) of a sufficient concentration to completely saponify the oleic acid and form a counter colloid, which takes up the colloided carbon suspended in the oil. I may also add a suitable salt (say about one and one-half pounds of sodium chlorid or sodium sulfate) to facilitate separation and prevent the formation of an emulsion. The soda ash, or soda ash and salt (if the latter be used) should be dissolved in about nine gallons of water.

I then apply centrifugal force to remove from the lighter oil the heavier saponified matter or soap solution and the previously suspended carbon and dirt that has been transferred from the oil to the soap solution. This is a separating or purifying process in that it involves the separation of oil from soap, water and dirt, and a type of separator would be used provided with an outlet for the oil and a separate outlet for the specified impurities. The centrifuge of the Snyder Patent No. 1,283,343 of October 29, 1918, is especially adapted for this use.

The process above described gives an oil which is free from carbon and dirt, and contains so little water that it would normally be considered substantially dehydrated, being adapted to most purposes for which oil is used; but it still contains too much water to adapt it for use as switch oil. Indeed, owing to the addition of water involved in the treatment with a water solution of an alkali and a saponifiable oil, the partially purified oil may contain slightly more water than before treatment.

To further dehydrate the partially purified oil, I subject the oil to centrifugal force under conditions which will insure the elimination of practically all the remaining water. Preferably centrifugal force is applied while continuously introducing fresh quantities of the oil and providing for the continuous outflow of the dehydrated oil and confining from escape the water that is carried to the periphery, allowing an envelope of water of gradually increasing thickness to build up as the operation proceeds. This step of the process is a clarifying or dehydrating process and must be carried on in a centrifuge that has only one outlet, namely: an outlet for the lighter liquid.

In the specific embodiment of the present invention I provide means whereby a separator of the Snyder type can be readily modified to adapt it for the purpose of clarification or dehydration. Thereby both steps of the described process can be carried out without the necessity of purchasing and installing two different centrifuges.

In the drawings:

Fig. 1 is a partial view of a centrifugal purifier or separator in vertical section.

Fig. 2 is a similar view with the bowl cover removed and a sealing gasket inserted and resting on the top disc.

Fig. 3 is a view, partly in elevation and partly in section, of the entire bowl with the bowl cover re-applied and confining the sealing gasket in position to seal the discharge outlet for the heavier liquid.

$a$ is the body of the bowl shell, $b$ the bowl shaft, $c$ the bowl nave, $d$ a disc carrier having an upward extension forming a central receiving chamber, $e$ passages leading from the receiving chamber to the periphery of the bowl, $f$ separating discs, $g$ a special top or discharge disc with a shoulder $h$ and neck $i$; $k$, $m$ and $n$ driving wings, and $o$ the bowl cover secured to the bowl shell by a nut $p$.

In all three figures the lighter separated liquid escapes by moving up inside the neck $i$ and discharging at $r$. Referring to Fig. 1, the heavier separated liquid, which may or may not carry solids with it, passes from the periphery of the separating chamber to the space above the top disc $g$ and thence through the passage between the top disc and the bowl cover $o$ and escapes over the annular weir $s$ formed by the inside edge of the bowl covers.

To adapt the bowl for use as a clarifier or dehydrator, I unscrew the nut $p$, remove the bowl cover $o$, slip an annular gasket $t$ over the neck $i$ of the top disc and move it down until it rests on the shoulder $h$, replace the bowl cover $o$ (as indicated in Fig. 2), bring it down to its seat and by means of the nut $p$ secure the bowl cover in position and firmly clamp the gasket $t$ between the inner edge of the cover and the shoulder $h$ of the top disc, as shown in Fig. 3. The outlet for the heavier ingredients is now closed and the bowl is adapted to function as a clarifier or dehydrator, all the lighter liquid flowing out at $r$, the solids or heavier liquid accumulating at the periphery of the bowl and remaining therein.

It will now be understood that the first centrifugal operation in the process of treating switch oil may be carried out in the separator and purifier illustrated in Fig. 1, while the second centrifugal operation in the same process may be carried out in the clarifier or dehydrator illustrated in Fig. 3.

While I have given but one example of the uses to which my improved convertible separator is adaptable, it will readily be understood that it may be used for separating various liquids of different specific gravities; for purifying a liquid having a heavier liquid and solid matters mixed therewith; for clarifying a liquid by removing therefrom heavier solid ingredients; and for clarifying a liquid by removing therefrom a relatively minute proportion of either a heavier liquid or a heavier liquid and solid.

The convertible centrifuge is particularly adapted for use in plants in which the requirements would prohibit the outlay required for two separate machines.

Having now fully described my invention, what I claim and desire to protect by Letters Patent is:

1. A convertible centrifuge comprising a bowl body, a liner within the bowl comprising a number of discs for dividing the liquid into layers, there being openings for the escape of liquid constituents of different specific gravities, a removable bowl cover, and a removable annular gasket adapted, when inserted in the bowl, to be confined in non-adjustable position between the bowl cover and the liner in position to block the escape of liquid through one of said openings.

2. A convertible centrifuge comprising a bowl shell consisting of a bowl body and a removable bowl cover, there being openings for the escape of the respective liquid constituents of different specific gravities, and a removable member forming a gasket adapted, when inserted in the bowl, to be held against the bowl cover in undisplaceable relation thereto and in position to seal the opening for the escape of the heavier liquid constituent.

3. A convertible centrifuge comprising a bowl body, a removable bowl cover, a discharge disc having a frusto-conical portion, there being discharge openings for the heavier and lighter ingredients respectively communicating with the spaces inside and outside the discharge disc, and an annular member adapted, in the application of the cover to the body, to be confined between the discharge disc and cover and when so confined substantially prevent the heavier constituent separated in the separating chamber of the bowl from flowing out the discharge opening for the heavier liquid.

4. A convertible centrifuge comprising a bowl body, a removable bowl cover, a discharge disc having a frusto-conical portion, there being discharge openings for the heavier and lighter ingredients respectively communicating with the spaces inside and outside the discharge disc, and an annular member adapted to overlie a part of the discharge disc and, in the application of the bowl cover to the bowl body, adapted to be engaged by the bowl cover and, together with the discharge disc, to be subjected to a compressing action, thereby confining the annular member in fixed relation to both the bowl cover and discharge disc and in position to substantially prevent the outflow of the heavier liquid separated in the separating chamber of the bowl from escaping from the heavier liquid discharge.

5. In a device of the character described, a bowl body, a removable bowl cover, a liner for dividing the liquid into thin layers and spaced a substantial distance from the bowl wall to afford an open annular space, a central receiving chamber, there being passages from said chamber to the separating chamber of the bowl, a discharge disc above the liner the outer part of which overhangs the liner and is spaced a relatively short distance from the bowl wall, there being a path of escape for the lighter constituent from inside the discharge disc to the outside of the bowl and a path of escape for the heavier constituent from the outer edge of the top disc and between the top disc and the bowl cover to the outside of the bowl, and means for sealing said last mentioned discharge path, said means occupying a fixed position of closure after the bowl cover is applied to the bowl body.

In testimony of which invention, I have hereunto set my hand at New York, on this 30th day of April, 1921.

CYRUS HOWARD HAPGOOD.

Witnesses:
R. R. WARREN,
G. D. TALLMAN.